United States Patent [19]

Basseen et al.

[11] Patent Number: 5,207,895
[45] Date of Patent: May 4, 1993

[54] OIL/WATER SEPARATOR

[75] Inventors: Sanjiv K. Basseen, Oak Ridge; Devendra K. Sahu; Masoud Zarif, both of Knoxville, all of Tenn.

[73] Assignee: Pioneer Air Systems, Inc., Morgan County, Tenn.

[21] Appl. No.: 898,319

[22] Filed: Jun. 15, 1992

[51] Int. Cl.⁵ .................. C02F 1/40; B01D 17/022; B01D 15/00
[52] U.S. Cl. .................................... 210/95; 210/109; 210/262; 210/265; 210/180; 210/187; 210/539; 210/540; 210/521; 210/DIG. 5; 210/188
[58] Field of Search ................. 210/259, 265, DIG. 5, 210/95, 109, 188, 539, 540, 532.1, 536, 537, 521, 262, 180, 182, 187, 184

[56] References Cited
U.S. PATENT DOCUMENTS

| | | | |
|---|---|---|---|
| 3,558,482 | 1/1971 | DeYoung | 210/265 |
| 4,116,835 | 9/1978 | Bertelson | 210/DIG. 5 |
| 4,139,463 | 2/1979 | Murphy et al. | 210/259 |
| 4,145,280 | 3/1979 | Middlebeek et al. | 210/265 |
| 4,203,843 | 5/1980 | Carlstedt | 210/265 |
| 4,265,759 | 5/1981 | Verpalen et al. | 210/265 |
| 4,315,822 | 2/1982 | Jaisinghani | 210/259 |
| 4,534,869 | 8/1985 | Seibert | 210/259 |
| 4,673,499 | 6/1987 | Koch et al. | 210/DIG. 5 |
| 4,684,467 | 8/1987 | Cloud | 210/519 |
| 4,761,968 | 8/1988 | Basseen et al. | 55/387 |
| 4,801,313 | 1/1989 | Mann | 210/DIG. 5 |
| 4,859,329 | 8/1989 | Fink | 210/DIG. 5 |
| 5,037,454 | 8/1991 | Mann | 210/DIG. 5 |
| 5,069,796 | 12/1991 | Fox | 210/259 |
| 5,104,529 | 4/1992 | Becker | 210/259 |
| 5,120,435 | 6/1992 | Fink | 210/265 |

Primary Examiner—Peter Hruskoci
Assistant Examiner—Cynthia L. Nessler
Attorney, Agent, or Firm—Pitts & Brittian

[57] ABSTRACT

A separator for removing oil-like substances from water using vertical columns of coalescing media to then enhance separation of the two phases. The coalescing media is an inert packing material having surfaces to enhance coalescing without significant resistance to flow. Final oil removal is achieved by a vertical column of charcoal pellets. The separator is of particular value in the processing of oil/water discharges from air compressing systems. This produces water that can be discharged in an environmentally safe manner to conventional sewers, etc. The oil is held in a convenient storage vessel for ultimate disposal. No pumping devices are needed in the separator as flow is provided either by the pressure in the outlet from the compressor system, or by gravity from a feed tank. The vertical columns are arranged within a cylindrical vessel to minimize floor space and plumbing. The oil concentration in the product water is below current EPA standards.

19 Claims, 4 Drawing Sheets

OIL/WATER SEPARATOR

TECHNICAL FIELD

This invention relates to devices for removing oil-like substances from water, and more particularly to a device for removing oil from water containing the same to a level such that the water can be disposed of in an environmentally safe manner. The device is embodied for use in the separation of oil from water which is a condensate waste stream from air compressor systems.

BACKGROUND ART

Air compressor systems generate a condensate waste stream that contains oil and water. This stream is particularly generated when refrigerant-type air dryers are utilized (see, for Example, U.S. Pat. No. 4,499,033 issued to S. Basseen, et al on Aug. 9, 1988). The water is a result of the removal of moisture from the air, and the oil is a result of the lubricant used in the compressor. For example, at 75° F. (23.9° C.) and 75 percent relative humidity, a 500SCFM (14.2 $Sm^3$/min.) compressor takes in 90 gallons (340.6 liters) of water in vapor form during a twenty-four hour period. Although some of the lubricating oils are removed in other portions of the system, an undesirable amount mixes with the condensed water vapor. While the amount of oil is generally less than 2% of the stream, this significantly exceeds standards established by the U. S. Environmental Protection Agency and various other governmental agencies for disposal into sewer systems.

Oil in the water coming from a compressor system is in the form of a very fine dispersion, very much like the oil aerosols that exist in oil/air flows in systems attached to the compressor. This significantly complicates the oil/water separation. Thus, to more effectively achieve separation, the small oil droplets are permitted to coalesce (to grow together, to unite). This is usually accomplished by allowing the mixture to be quiescent for extended periods of time. A device that employs this principle is described in U.S. Pat. No. 4,684,467 issued to J. A. Cloud on Aug. 4, 1987. Usually, however, not all of the oil will coalesce particularly when the droplets are very small. Another system, as applied to the coalescence of oil in air systems, involves passing the oil/air mixture through a filter whereby the small oil aerosols bond together on the filter media to form droplets large enough to be separated and drained by gravity. While applicable for oil/gas systems, this produces excessive pressure drop for oil/water systems.

Accordingly, it is an object of the present invention to provide an oil/water separator that results in water that can be disposed of in an environmentally safe manner.

It is a further object of the present invention to provide a coalescence-type oil/water separator for adequately removing the oil from the water so as to minimize disposal costs.

It is another object of the present invention to provide a vertical coalescer to enhance separation of oil from water containing the same so that the oil concentration in the product water is sufficiently low such that the water can be easily disposed of in conventional sewer systems.

These and other objects of the present invention will become apparent upon a consideration of the drawings referred to hereinafter and a complete description thereof.

DISCLOSURE OF THE INVENTION

In accordance with the present invention there is provided a coalescence-type oil/water separator wherein an oil/water mixture, after removal of any air, is passed vertically through a column containing coalescence-assisting media. The mixture exiting this column has enlarged oil droplets that move to the top of the body of water. The water, with the main portion of oil removed, then passes vertically through a column of an oil-adsorbing material for additional oil removal. Oil is skimmed from the top of the body of separated water, and water is removed from below the oil/water interface. In a preferred embodiment, a second vertically-oriented column of coalescence-assisting media is incorporated into the separator and a skimmer to remove the oil is adjustable in elevation to enhance the oil removal. In addition, the preferred embodiment includes a vapor adsorber to remove oil vapor from air being released to the atmosphere. Movement through the separator is effected by the incoming pressure of the air/oil/water mixture.

BEST MODE FOR CARRYING OUT THE INVENTION

Figure 1:
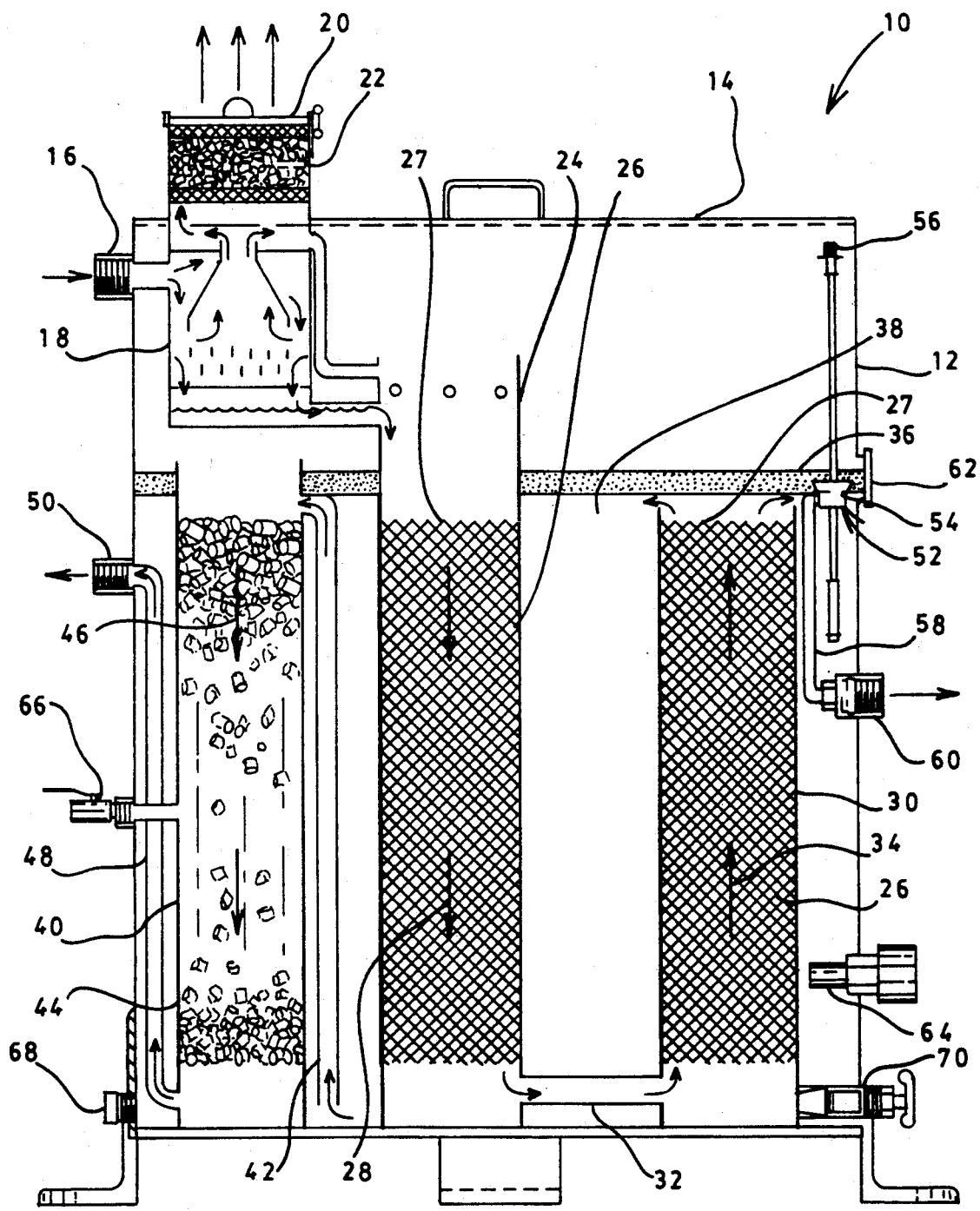
FIG. 1 is a schematic/cross-sectional drawing of an embodiment of the present invention showing the components and the flow paths.

An embodiment of the present invention is depicted generally at 10 in FIG. 1. The coalescing media is contained in a vessel 12, which typically is cylindrical, having a removable cover 14. The device is provided with an inlet 16 for the admission of an inlet stream containing air, water and oil (in the case of processing condensate from an air compressing system). This inlet stream is directed to a separator 18 wherein the liquids thereof are separated from the air, with the air departing the device through an exhaust 20. Preferably the exhaust 20 contains a vapor adsorber 22, such as a bed of activated carbon pellets, so that the exiting air can be discharged into the normal environment.

The liquid resulting from the separator 18 is directed to a coalescing chamber 24 which is an upright container (typically cylindrical) containing coalescing-enhancing media 26. Flow is in a vertical direction (parallel to gravity) in this chamber 26. The direction of flow is indicated by the arrow 28. Preferable the coalescing-enhancing media 26 is contained within a porous net bag 27 for ease in insertion and removal. The media 26 is an inert structure exhibiting extensive surface area for impacting by the oil droplets while exhibiting very small resistance to flow. This media 26 can take on may forms, such as very open spheres that can be "Jaeger Tri-Packs" as manufactured by Jaeger Products, Inc. of Houston Tex. Another suitable form is the Maspac ® tower packing manufactured by Clarkson Controls & Equipment Co. of Detroit, Mich. Still another suitable packing form is an open cylindrical Ballast® Ring from Century Plastics, Inc. For example, one-half inch open cylinders are useful in the invention. Typically all of these forms are fabricated from polypropylene and related materials. A preferred form of coalescing media, however, is a fiberglass pad as manufactured by Corning.

In the preferred embodiment illustrated in this figure, there is a second vertically oriented coalescing chamber 30. This is joined to chamber 24 with a duct 32 such that there is fluid communication between chambers 24 and 30. Flow is again vertical as indicated by arrow 34. By the time fluid reaches the top of chamber 30 oil droplets are essentially fully coalesced so that two separate phases exist: an oil phase 36 and a water phase 38. Since the oil phase 36 is lighter than the water phase 38, it floats on the surface within the vessel 12.

Water that is substantially devoid of oil is taken from the bottom of the vessel 12 and directed to a filtration chamber 40 through a transfer pipe 42. Filter chamber 40 contains activated charcoal pellets 44, or similar adsorbant material, that preferably are contained in a porous net bag (not shown) for ease in placement and removal. Flow through chamber 40 is vertical as indicated by the arrow 46. The charcoal pellets 44 remove final traces of oil, with the cleansed water passing through pipe 48 to an outlet 50. This water, since the oil content is less than the minimum standard set by the EPA, can be discharged to a sewer or disposed of in any other manner.

In a typical oil/separator of the present invention the vessel 12 has a diameter of about 12-25 inches and a height of about 25-45 inches. The primary coalescing column 24 has a diameter of about 2-8 inches and a height of about 15-40 inches, while the secondary coalescing column 30 has a diameter of about 2-8 inches and a height of about 15-35 inches. The adsorber column 40 typically has a diameter of about 2-8 inches and a height of about 15-40 inches.

The oil phase 38 is removed from the vessel 12 using a skimmer device 52. This consists of an overflow cup 54 with the level thereof adjustable with knob 56. Raising the cup upwardly lowers the oil discharge, and downward movement increases the oil discharge. Typically the lip of the cup 54 should be at least 0.25 in. (6 mm) above the static water level in the vessel 12. Oil collected into the cup 54 then flows through pipe 58 to an oil outlet 60. Since the quantity of oil is relatively small, it can be collected and stored for future environmentally-approved disposal. Alternatively, this oil can be recycled or reused.

This preferred embodiment illustrated in FIG. 1 is provided with certain auxiliary features. As discussed above, there is a vapor adsorber 24 in the air exhaust 22. A sight glass 62 is associated with the skimmer 52 so that the level of the oil phase 36 can be observed to aid in the adjustment of the level of the cup 54. In applications where the separator 10 might be subject to freezing, appropriate temperature within the vessel 12 can be effected by a heater 64 that passes into the water phase 38. Also, as shown in FIG. 3, insulation can be applied to the vessel 12. A sampling valve 66 communicating with the filtration chamber 40 permits sampling of the water phase to assure adequate removal of oil by the charcoal. The entire vessel 12 can be drained through port 68, and the coalescing chambers 24 and 30 can be drained through port 70.

The degree of oil coalescing will depend upon the length of the path through the coalescing-enhancing media 26. Thus, in some applications a single chamber 24 (the primary coalescer) will be sufficient. For additional coalescing, the second chamber 30 will be needed.

Figure 2:
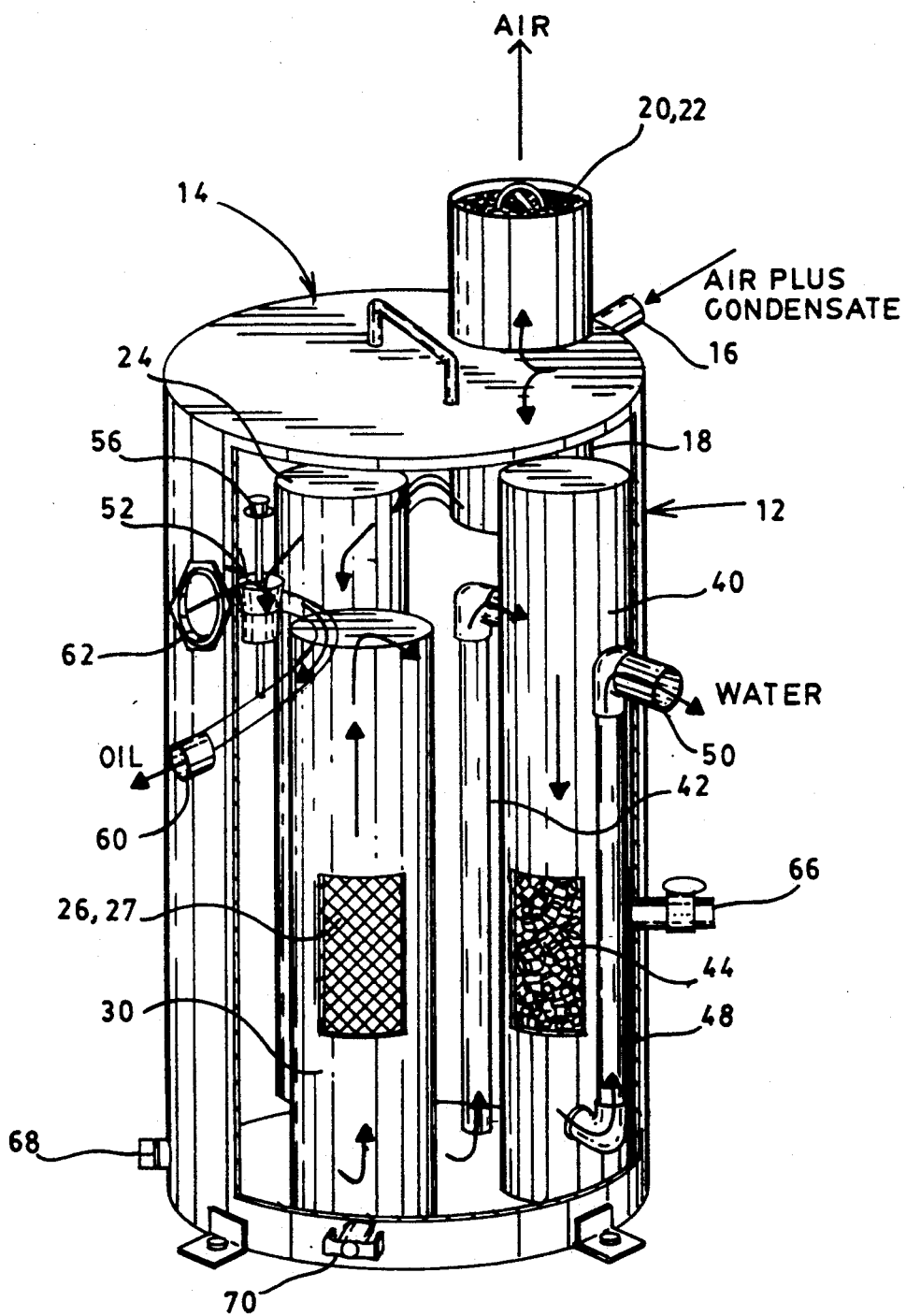
FIG. 2 is semi-isometric and cut-away drawing of the oil/water separator of FIG. 1 illustrating a typical position of the components within a cylindrical shell.

FIG. 2 illustrates the present invention 10 wherein the vessel 12 is cylindrical. Thus, the various chambers 24, 30 and 40 are arranged in a general cylindrical array within. This minimizes floor space and plumbing. The same components as illustrated in FIG. 1 are contained in this figure, with the direction of flow also indicated.

Figure 3A:
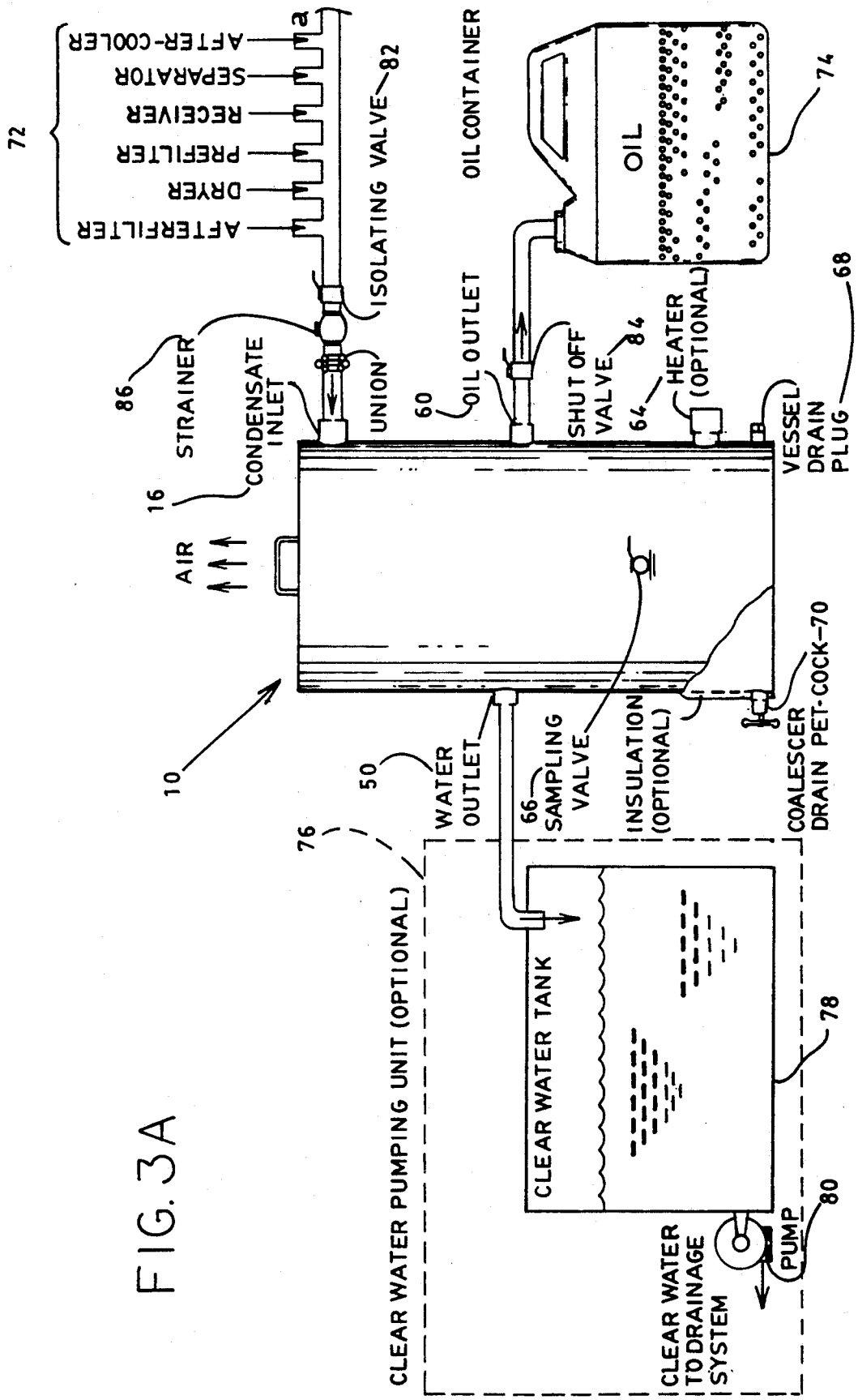
FIGS. 3A and 3B, in combination, form a schematic drawing illustrating the installation of the present invention relative to the handling of condensate from an air compressing system.
Figure 3B:
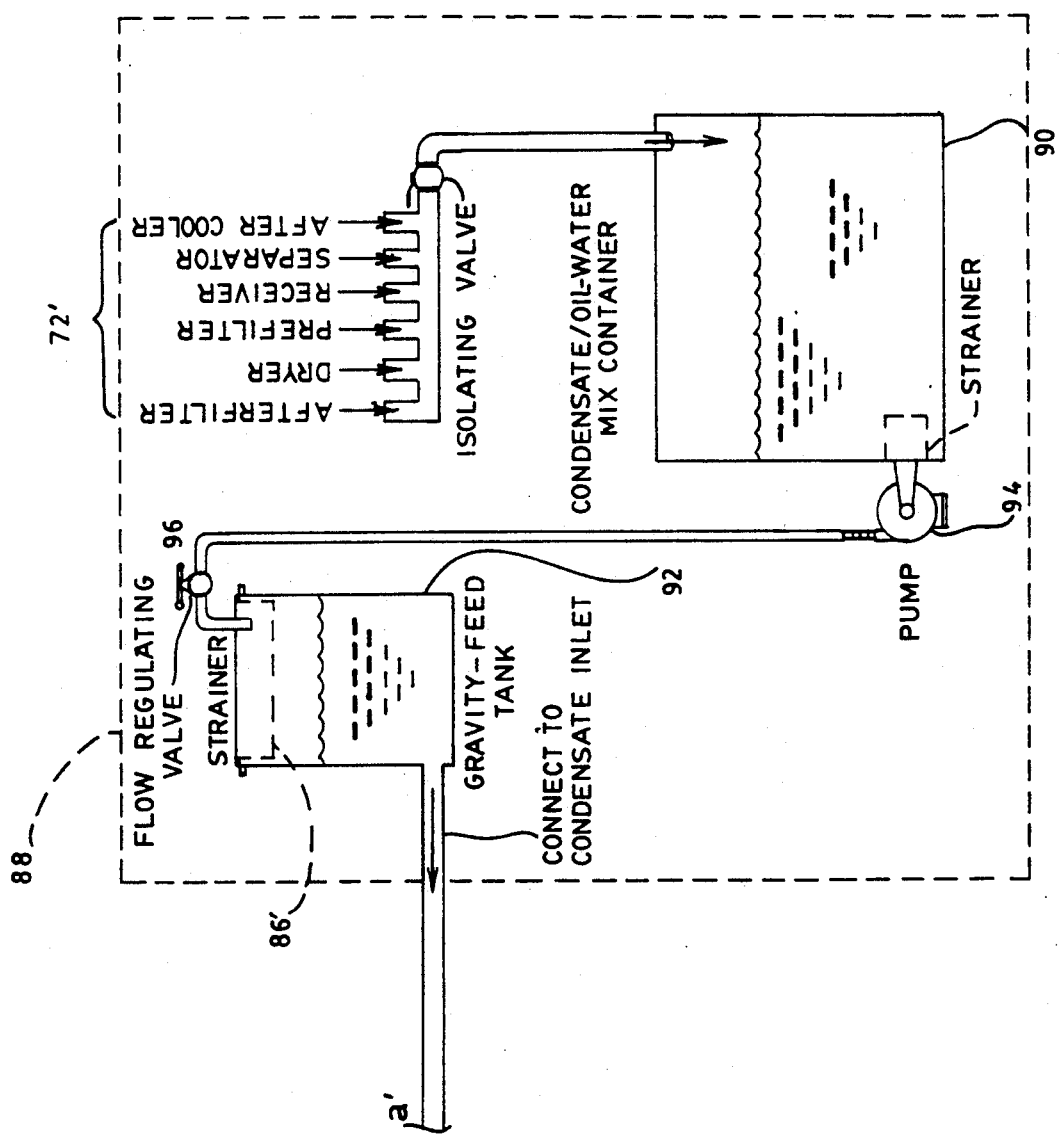

A schematic drawing depicting two variations in the use of the present invention in connection with an air compressor system are set forth in FIGS. 3A and 3B. When used "on line", various condensate discharges from the compressor system, as indicated at 72, are connected to the inlet 16. Typically the mixture is under pressure up to 250 PSIG (17 BarG). Most of this pressure is removed through the venting of the air, with any remaining pressure causing flow through the separator 10 that functions as described above. Oil from the oil outlet 60 is recovered in a vessel 74. Water can be directly discharged from the outlet 50; however, in the embodiment illustrated, an optional clear water handling system 76 is depicted. This includes a tank 78 to receive the water from outlet 50, and a pump 80 to ultimately transfer the water to any suitable drainage system. In this utilization the system would typically include valves 82, 84 and a strainer 86.

In the alternate embodiment of utilization of the present invention 10, as indicated at 88, the condensate output of various portions of an air compressor system indicated at 72, are collected in a collector vessel 90. Periodically a portion of the oil/water mixture is transferred to a gravity feed tank 92 using a pump 94. Typically a regulating valve 96 is used to control flow to the tank 92, and the tank 92 contains a strainer 86'. As desired, this feed tank 92 is discharged into the separator 10. Since the mixture received at the separator 10 contains little air, the pressure due to the elevation of the tank 92 causes flow through the separator 10 components. The output products are collected as described above.

From the foregoing, it will be understood by those versed in the art that an effective oil/water separator has been provided. While it is of particular use for treating oil/water condensate mixtures derived from air compressing systems, it will have use in other separations where such vertical columns of coalescing media will maximize separation efficiency. Since the air flow is separated from the other condensates, a calm liquid surface is maintained in the separator. The separator, itself, requires no pumps and, unless required for pumping from storage vessels, no pumps are required in the system. The system has been demonstrated to reduce the oil of the discharge water to the 2-20 PPM(Wt) range for nonsoluble and nonemulsifying oils. Thus, the resultant treated water can be disposed of in conventional sewers, etc., within current EPA limits. It will be understood that the separator as described herein has other uses than only for the condensate from the air compressing systems. In some applications there may not be an absolute need for the air/liquid separator or at least to the degree discussed herein. This would be similar to the alternative utilization as illustrated in FIG. 3.

Although certain specifications are given herein, these are not for the purpose of limitation. Rather, the invention is to be limited only by the appended claims and their equivalents when read together with the detailed description contained herein.

What is claimed is:

1. An oil/water separator for removing oil substances from water containing the same, said separator comprising:
   a containment vessel, said vessel having a vertical axis;
   a vertical coalescing column within said vessel having a first end and a second end in fluid communication with an interior volume of said vessel to discharge water and coalesced oil into said vessel for gravity separation to achieve a layer of oil phase on a water phase;
   an inlet, for receiving said water containing said oil substances, communicating with said first end of said vertical coalescing column;
   a packing of coalescing-enhancing media within said coalescing column, said media being inert to said oil substances and to water and exhibiting extended surfaces to enhance coalescing of oil without resistance to flow through said coalescing column;
   a vertical adsorber column within said vessel having a first end in communication with said water phase in said vessel and with a second end in fluid communication with a water outlet from said vessel;
   an adsorber media within said adsorber column for removing traces of oil from said water phase;
   a skimmer means positioned in communication with said oil phase to draw at least a portion of said oil phase, said skimmer means having an outlet in communication with an oil outlet from said vessel; and
   an air/liquid separator integrally mounted to said vessel, said air/liquid separator having an air discharge exterior said vessel and a liquid outlet in fluid communication with said vertical coalescing column, said air/liquid separator receiving said water containing said oil substances from said inlet.

2. The oil/water separator of claim 1 wherein said skimmer means comprises:
   a skimmer cup in communication with said oil outlet from said vessel; and
   means for adjusting elevation of said skimmer cup to adjust flow of said oil from said vessel to said oil outlet.

3. The oil/water separator of claim 1 wherein said air discharge of said air/liquid separator includes a vapor adsorber to prevent oil vapor discharge from said vessel.

4. The oil/water separator of claim 1 wherein said adsorbent media within said adsorber column comprises activated carbon pellets.

5. The oil/water separator of claim 1 wherein said first end of said vertical adsorber column is in an upper portion of said vessel and is in communication with said water phase proximate a lower portion of said vessel, and said second end is in a lower portion of said vessel whereby flow through said adsorber column is downwardly through said adsorber media.

6. The oil/water separator of claim 1 wherein flow through said coalescing column and said adsorber column is effected by pressure at said inlet to said air/liquid separator, said pressure being produced by at least gravity due to an elevation of said inlet to said air/liquid separator.

7. The oil/water separator of claim 1 wherein said coalescing-enhancing media is contained in an inert mesh bag to facilitate loading and unloading of said coalescing column.

8. The oil/water separator of claim 1 wherein said vertical coalescing column comprises:
   a first vertical column having an upper end in fluid communication with said liquid outlet of said air/liquid separator and a lower end whereby flow in said first vertical column is downwardly, said first vertical column containing said coalescing-enhancing media; and
   a second vertical column having a lower end in fluid communication with said lower end of said first vertical column and an upper end in fluid communication with said interior of said vessel to produce said oil phase and said water phase within said vessel whereby flow in said second vertical column is upwardly, said second vertical column containing said coalescing-enhancing media.

9. The oil/water separator of claim 8 wherein said coalescing-enhancing media in each of said first and second vertical coalescing columns is contained in an inert mesh bag to facilitate loading and unloading from said first and second vertical coalescing columns.

10. An oil/water separator for removing oil substances from water containing the same, said separator comprising:
   a containment vessel, said vessel having a vertical axis, said vessel defined by a peripheral wall and bottom wall and being provided with a removable cover member;
   an air/liquid separator mounted within said vessel, said air/liquid separator having an air discharge exterior said vessel and a liquid outlet, said air discharge provided with a vapor adsorber therein to prevent escape of vapors with exiting air;
   an inlet, for receiving said water containing said oil substances, communicating with said air/liquid separator;
   a first vertical coalescing column within said vessel having an upper end in fluid communication with said liquid outlet of said air/liquid separator and a lower end;
   a second vertical coalescing column within said vessel having a lower end in fluid communication with said lower end of said first coalescing column and an upper end in fluid communication with an interior of said vessel to discharge water and coalesced oil into said vessel for gravity separation to achieve a layer of oil phase on a water phase;
   a packing of coalescing media within said first and second coalescing columns, said media being inert to said oil substances and to water and exhibiting extended surfaces to enhance coalescing of oil without resistance to flow through said coalescing columns;
   a vertical adsorber column within said vessel having a first end in communication with said water phase in said vessel proximate said bottom wall and with a second end in fluid communication with a water outlet from said vessel;
   a packing of activated carbon pellets within said adsorber column for removing traces of oil from said water phase; and a skimmer means positioned in communication with said oil phase to draw at least a portion of said oil phase, said skimmer means having a skimmer cup in communication with an oil outlet from said vessel and means for adjusting an elevation of said skimmer cup to control an amount of oil directed to said oil outlet.

11. The oil/water separator of claim 10 wherein said coalescing media in each of said first and second vertical coalescing columns is contained in an inert mesh bag to facilitate loading and unloading from said first and second vertical coalescing columns.

12. The oil/water separator of claim 10 where said coalescing media is a fiberglass pad.

13. The oil/water separator of claim 10 where said peripheral wall of said vessel is cylindrical, and said coalescing columns and said adsorbing column are arranged in substantially a cylindrical array within said vessel.

14. The oil/water separator of claim 10 wherein drain means in said peripheral wa said vessel communicates with said interior of said vessel for selectively draining said vessel.

15. The oil/water separator of claim 14 where further drain means in said peripheral wall of said vessel communicates with said first and second coalescing columns for selectively draining said coalescing columns.

16. The oil/water separator of claim 10 further comprising a sight glass in said peripheral wall proximate said skimmer cup for observing proper elevational placement of said skimmer cup.

17. The oil/water separator of claim 10 wherein flow through said coalescing columns and said adsorber column is effected by pressure at said inlet to said air/liquid separator, said pressure being produced by at least gravity due to an elevation of said inlet to said air/liquid separator.

18. The oil/water separator of claim 10 further comprising heating means passing through said peripheral wall into said vessel.

19. An oil/water separator for removing oil substances from water containing the same, said separator comprising:

a containment vessel, said vessel having a vertical axis, said vessel defined by a cylindrical peripheral wall and a bottom wall, and being provided with a removable cover member;

an air/liquid separator mounted within said vessel, said air/liquid separator having an air discharge exterior said vessel and a liquid outlet, said air discharge provided with a vapor adsorber therein to prevent escape of vapors with exiting air;

an inlet, for receiving said water containing said oil substances, communicating with said air/liquid separator;

a first vertical coalescing column within said vessel having an upper end in fluid communication with said liquid outlet of said air/liquid separator, and a lower end;

a second vertical coalescing column within said vessel having a lower end in fluid communication with said lower end of said first coalescing column, and an upper end in fluid communication with an interior of said vessel to discharge water and coalesced oil into said vessel for gravity separation to achieve a layer of oil phase on a water phase within said vessel;

a randomly-oriented packing of fiberglass pad within said first and second coalescing columns, said fiberglass pad encased within porous mesh bags to facilitate loading and unloading said coalescing columns;

a vertical adsorber column within said vessel having a first end in communication with said water phase in said vessel proximate said bottom wall and with a second end in fluid communication with a water outlet from said vessel;

a packing of activated carbon pellets within said adsorber column for removing traces of oil from said water phase;

a skimmer means positioned in communication with said oil phase to draw at least a portion of said oil phase, said skimmer means having a skimmer cup in communication with an oil outlet from said vessel and means for adjusting an elevation of said skimmer cup to control an amount of oil directed to said oil outlet;

a sight glass window in said peripheral wall proximate said skimmer cup to observe an elevational position of said skimmer cup for optimum removal of said oil phase;

a drain communicating with said interior of said vessel for selectively draining liquids from said vessel; and a further drain communicating with said coalescing columns for selectively draining liquids from said coalescing columns.

* * * * *